ized Patent

United States Patent [19]
Albrecht et al.

[11] Patent Number: 5,835,594
[45] Date of Patent: Nov. 10, 1998

[54] METHODS AND APPARATUS FOR PREVENTING UNAUTHORIZED WRITE ACCESS TO A PROTECTED NON-VOLATILE STORAGE

[75] Inventors: Mark Albrecht, Banks; Frank Wildgrube, Hillsboro, both of Oreg.

[73] Assignee: Intel Corporation, Santa Clara, Calif.

[21] Appl. No.: 598,803

[22] Filed: Feb. 9, 1996

[51] Int. Cl.[6] .................................................. H04L 9/00
[52] U.S. Cl. .................................................. 380/23; 25/4
[58] Field of Search .................... 380/3, 4, 23, 24, 380/25, 30

[56] References Cited

U.S. PATENT DOCUMENTS

| | | | |
|---|---|---|---|
| 4,278,837 | 7/1981 | Best | 178/22.09 |
| 5,022,077 | 6/1991 | Bealkowski et al. | 380/4 |
| 5,144,659 | 9/1992 | Jones | 380/4 |
| 5,289,540 | 2/1994 | Jones | 380/4 |
| 5,377,264 | 12/1994 | Lee et al. | 380/4 |
| 5,421,006 | 5/1995 | Jablon et al. | 380/4 |
| 5,465,299 | 11/1995 | Matsumoto et al. | 380/23 |
| 5,479,509 | 12/1995 | Ugon | 380/23 |

OTHER PUBLICATIONS

PCT International Search Report for International Application No. PCT/US97/01965, dated Jun. 9, 1997.

*Primary Examiner*—Thomas H. Tarcza
*Assistant Examiner*—Carmen D. White
*Attorney, Agent, or Firm*—Blakely, Sokoloff, Taylor & Zafman

[57] ABSTRACT

An electronic signature is generated in a predetermined manner and attached to a transferable unit of write data, to facilitate authenticating the write data before allowing the write data to be written into a protected non-volatile storage. The write data is authenticated using a collection of secured authentication functions. Additionally, the actual writing of the authenticated write data into the protected non-volatile storage is performed by a secured copy utility.

23 Claims, 7 Drawing Sheets

METHODS AND APPARATUS FOR PREVENTING UNAUTHORIZED WRITE ACCESS TO A PROTECTED NON-VOLATILE STORAGE

BACKGROUND OF THE INVENTION

1. Field of the Invention

The present invention relates to the field of computer systems. More specifically, the present invention relates to data security on computer systems.

2. Background Information

Existing methods of preventing unauthorized write access to nonvolatile storage such as FLASH memory typically rely on "secret" access methods to a write enable circuit. These "secret" access methods to the write enable circuit can be reverse-engineered through the use of standard debugging hardware. Once reverse engineered, a person will be able to produce code that can write to the "protected" non-volatile storage at will. If the code is used in a malicious manner, it can be used to introduce viruses into the "protected" non-volatile storage or even destroy the content of the non-volatile storage.

Thus, it is desirable to have a more robust approach to preventing unauthorized access to non-volatile storage, in particular, an approach that does not rely on the access method not being known. As will be described in more detail below, the present invention achieves these and other desirable results.

SUMMARY OF THE INVENTION

In accordance to the present invention, an electronic signature is generated in a predetermined manner and attached to a transferable unit of write data, to facilitate authenticating the write data before allowing the write data to be written into a protected non-volatile storage. The write data is authenticated using a collection of secured authentication functions. Additionally, the actual writing of the authenticated write data into the protected non-volatile storage is performed by a secured copy utility.

The electronic signature is functionally dependent on the content of the write data, and the predetermined manner of generating the electronic signature is reproducible during write time. In one embodiment, the electronic signature is generated by the creator of the write data, by generating a digest based on the content of the write data using a message digest function, and then encrypting the generated digest with a secret private key using an encryption function.

The collection of secured authentication functions include a secured corresponding copy of the message digest function, and a secured complementary decryption function. During operation, the secured decryption function reconstitutes the original digest by decrypting the electronic signature with a secured complementary public key, while the secured copy of the message digest function generates another digest based on the content of the write data to be authenticated. The two digests are compared using a secured comparison function. If the two digests pass the comparison, the secured copy utility is invoked to copy the authenticated write data into the protected non-volatile storage, otherwise, the write data are rejected.

In one embodiment, the authentication functions are secured by copying them into a normally unavailable system management memory during system initialization. The authentication functions are invoked using a system management interrupt (SMI), which when asserted, automatically maps the system management memory into the normal system memory space. A non-volatile memory write security circuitry is provided to qualify a memory write signal provided to the protected non-volatile storage, and to generate the SMI whenever a write to the protected non-volatile storage is requested.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
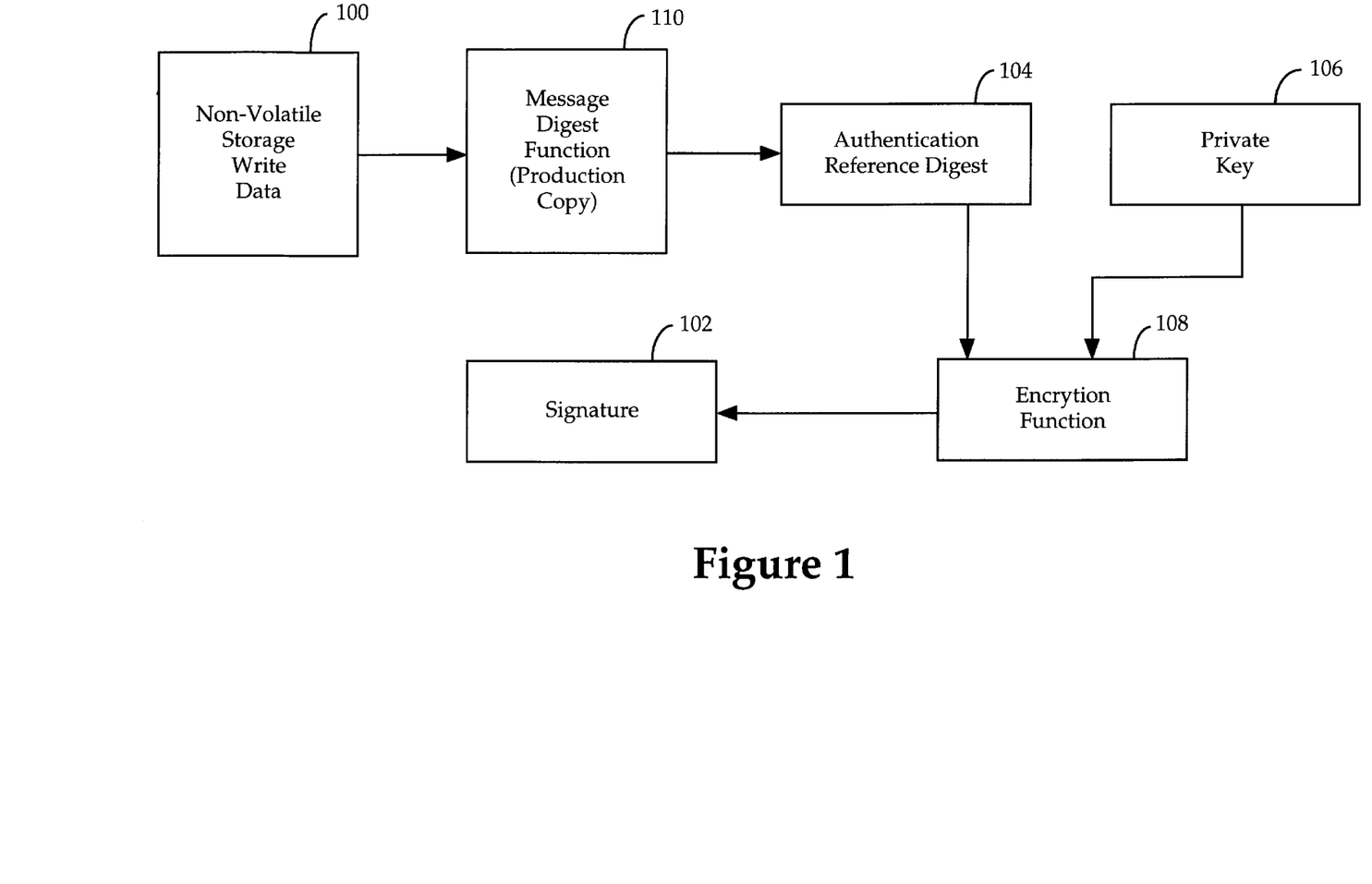
FIGS. 1–2 illustrate the essential elements of the present invention, and their interrelationships with each other.
Figure 2:
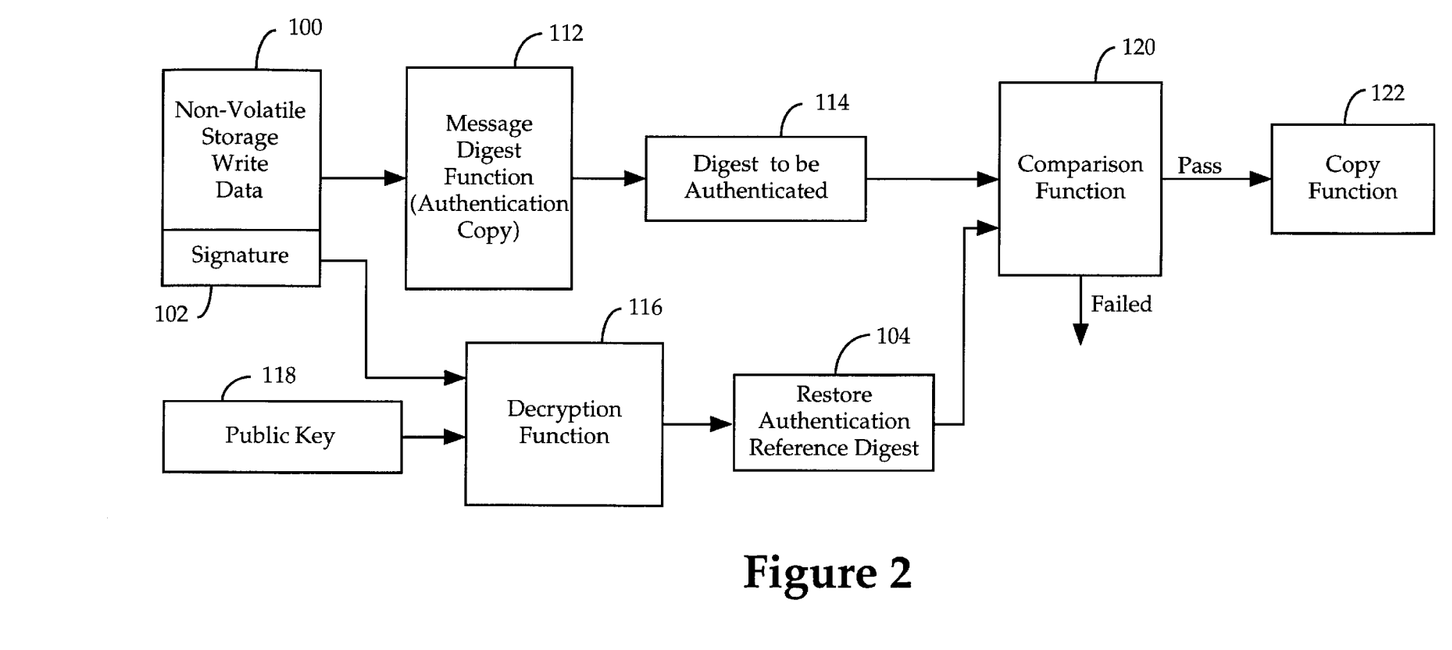

Referring now to FIGS. 1 and 2, two block diagrams illustrating the essential elements of the present invention, and their interrelationships to each other are shown. As illustrated, a transferable unit of non-volatile storage write data 100 is provided with an electronic signature 102 to facilitate authenticating write data 100 prior to allowing write data 100 to be written into a non-volatile storage. Preferably, electronic signature 102 is "attached" to write data 100. Examples of a transferable unit include a file, or a block, whereas examples of non-volatile storage include FLASH memory or erasable programmable read-only-memory (EPROM). Examples of write data is system basic input/output service (BIOS) updates, such as additions, deletions and modifications. For many applications, it is expected that electronic signature 102 is generated and "attached" to write data 100 at the time write data 100 is created.

For the illustrated embodiment, electronic signature 102 is generated by encrypting a reference digest 104 with a secret private key 106 using an encryption function 108. The reference digest 104 is generated using a message digest function 110. In other words, the content of reference digest 104 is functionally dependent on the content of write data 100. Accordingly, the content of electronic signature 102 is also functionally dependent on the content of write data 100.

At write time, a secured corresponding copy of message digest function 112 generates a "new" digest 114 in real time. At the same time, a secured complementary decryption function 116 reconstitutes original reference digest 104 by decrypting electronic signature 102 using secured complementary public key 118. The two digests 104 and 114 are provided to a secured comparison function 120 to determine if they are identical. The two digests 104 and 114 are identical if write data 100 is authentic, since both digests 104 and 114 are functionally dependent on the contents of write data 100, generated by copies of the same message digest function 110 and 112, and the encryption were decrypted in a complementary manner. If the two digests 104 and 114 compared successfully, a secured copy function 122 is notified to perform the actual writing into the protected non-volatile storage, otherwise the write data is rejected.

Encryption and decryption functions 108 and 116 may implement any one of a number of private/public key encryption/decryption techniques known in the art. Similarly, message digest function 110/112 may also implement any one of a number of message digest techniques known in the art. For further information on private/public key encryption/decryption techniques, see e.g. Hellman et al., Public Key Cryptographic Apparatus and Method, U.S. Pat. No. 4,218,582, and Rivest et al., Cryptographic Communications System and Method, U.S. Pat. No. 4,405,829; and for further information on message digest, see e.g. Method for Identifying Subscribers and for Generating and Verifying Electronic Signatures in a Data Exchange System, U.S. Pat. No. 4,995,082, and Rivest, The MD5 Message Digest Algorithm, Request For Comment (RFC) 1321, April 1992.

Creation of electronic signature 102 and associating it with write data 100 as described above, may be practiced in any number of computer systems known in the art, provided they are equipped to store and execute message digest function 110 and encryption function 108. It is anticipated that for most applications, creation of electronic signature 102 will be practiced on the same computer system where write data 100 is created. For example, for the above mentioned system BIOS update application, it is anticipated that the system BIOS updates and electronic signature 102 will be generated and associated at the same time and on the same computer system.

Figure 3:
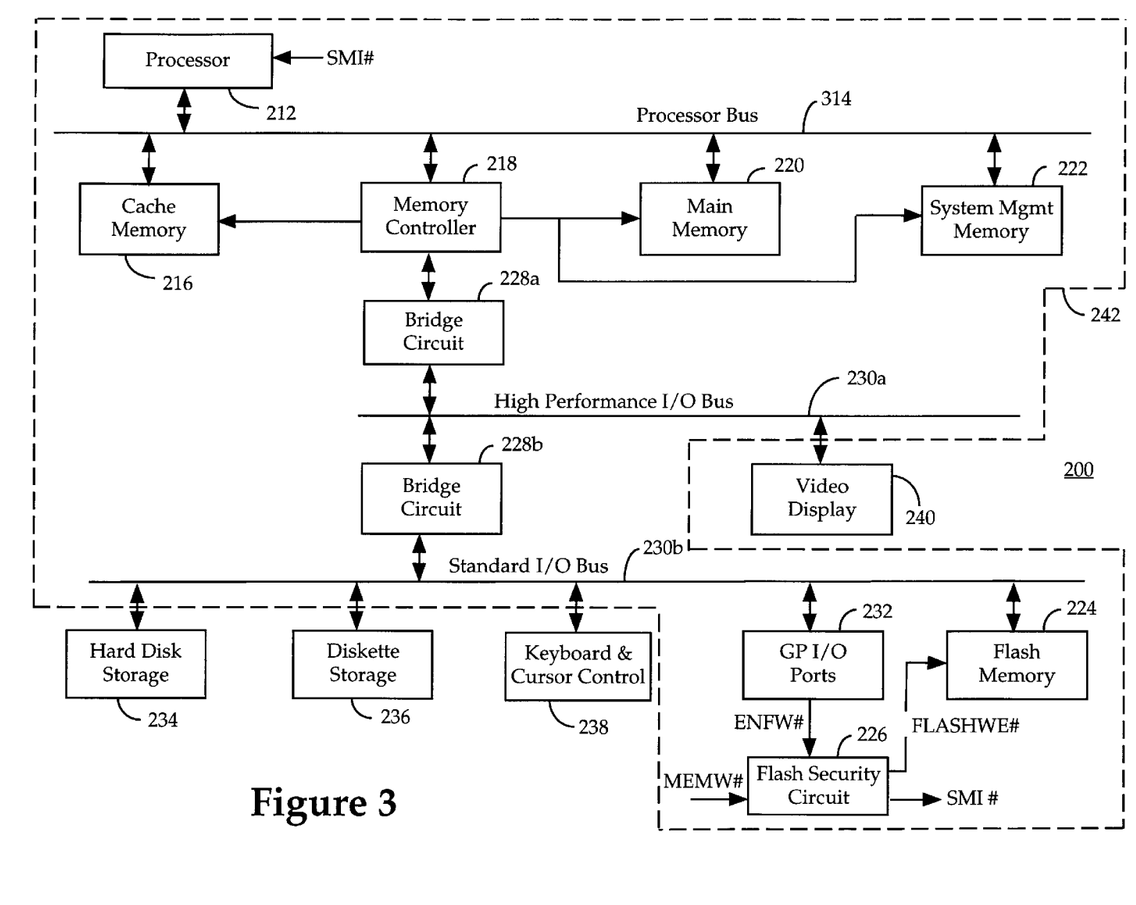
FIG. 3 illustrates an exemplary computer system incorporated with the teachings of the present invention on securing the authentication functions.

FIG. 3 illustrates an exemplary computer system 200 incorporated with the teachings of the present invention on authenticating write data before allowing the write data to be written into a protected non-volatile storage. Exemplary computer system 200 includes processor 212, processor bus 214, cache memory 216, memory controller 218, and a plurality of other memory units 220–224 coupled to each other as shown. Other memory units 220–224 include main memory 220, system management memory 222, and FLASH memory 224. In accordance to the present invention, exemplary computer system 200 includes in particular FLASH security circuitry 226. Additionally, computer system 200 includes bridge circuits 228a–228b, high performance and standard (input/output) I/O buses 230a–230b, general purpose I/O (GPIO) ports 232, hard and diskette storages 234–236, keyboard and cursor control device 238, and display 240, coupled to each other and the above enumerated elements as shown.

For the illustrated embodiment, buses 214, 230a and 230b are disposed on motherboard 242. Elements 212, 216–226, 228a–228b and 232 are either removably interconnected to motherboard 242 via sockets (not shown) or "soldered" onto motherboard 242, whereas elements 234–238 are coupled to motherboard 42 through cables and connectors (not shown).

Processor 212 performs the conventional function of executing code. Processor 212 is equipped to execute code in multiple modes including a system management mode (SMM). Processor 212 is also equipped to respond to a wide variety of interrupts including a system management interrupt (SMI), which places processor 212 in SMM. Memory controller 218 and volatile memory units 216, 220 and 222 perform the conventional functions of controlling memory access, and providing execution time storage respectively. In particular, for each write access to memory, memory controller 218 generates a MEMW# signal for the addressed memory unit. Memory controller 218 normally does not map system management memory 222 as part of the normal system memory space. System management memory 222 is mapped into the system memory space, when processor 212 enters SMM. Furthermore, except for system initialization, processor mode transition, and execution in SMM, system management memory 222 is write disabled.

FLASH memory 224 performs its conventional function of providing non-volatile storage respectively. In particular, FLASH memory 224 stores system BIOS. During system initialization, the bulk of the system BIOS that are not security sensitive are loaded into main memory 220, whereas the remaining system BIOS (including in particular the write data authentication functions) that are security sensitive are loaded into system management memory 224. Flash security circuit 226 protects FLASH memory 224 from unauthorized write accesses, by keeping FLASH memory 224 write disabled, and generating an SMI to invoke the secured system BIOS write data authentication functions in system management memory 222 to authenticate the write data, whenever it enables FLASH memory 224 for a write access. General purpose I/O ports 232 also perform their conventional functions for providing I/O ports to a variety of peripherals. In particular, one of the I/O ports is used to notify FLASH security circuit 226 of a write request to FLASH memory 224. The write request is denoted by writing to a corresponding register of the I/O port using a standard I/O instruction of exemplary computer system 200.

Hard disk storage 234 also performs the conventional function of providing non-volatile storage. In particular, hard disk storage 234 stores operating system of exemplary computer system 200. During system initialization, operating system is loaded into main memory 220. All other elements perform their conventional function known in the art. Except for the particularized functions and/or requirements, all enumerated elements are intended to represent a broad category of these elements found in computer systems.

Figure 4:
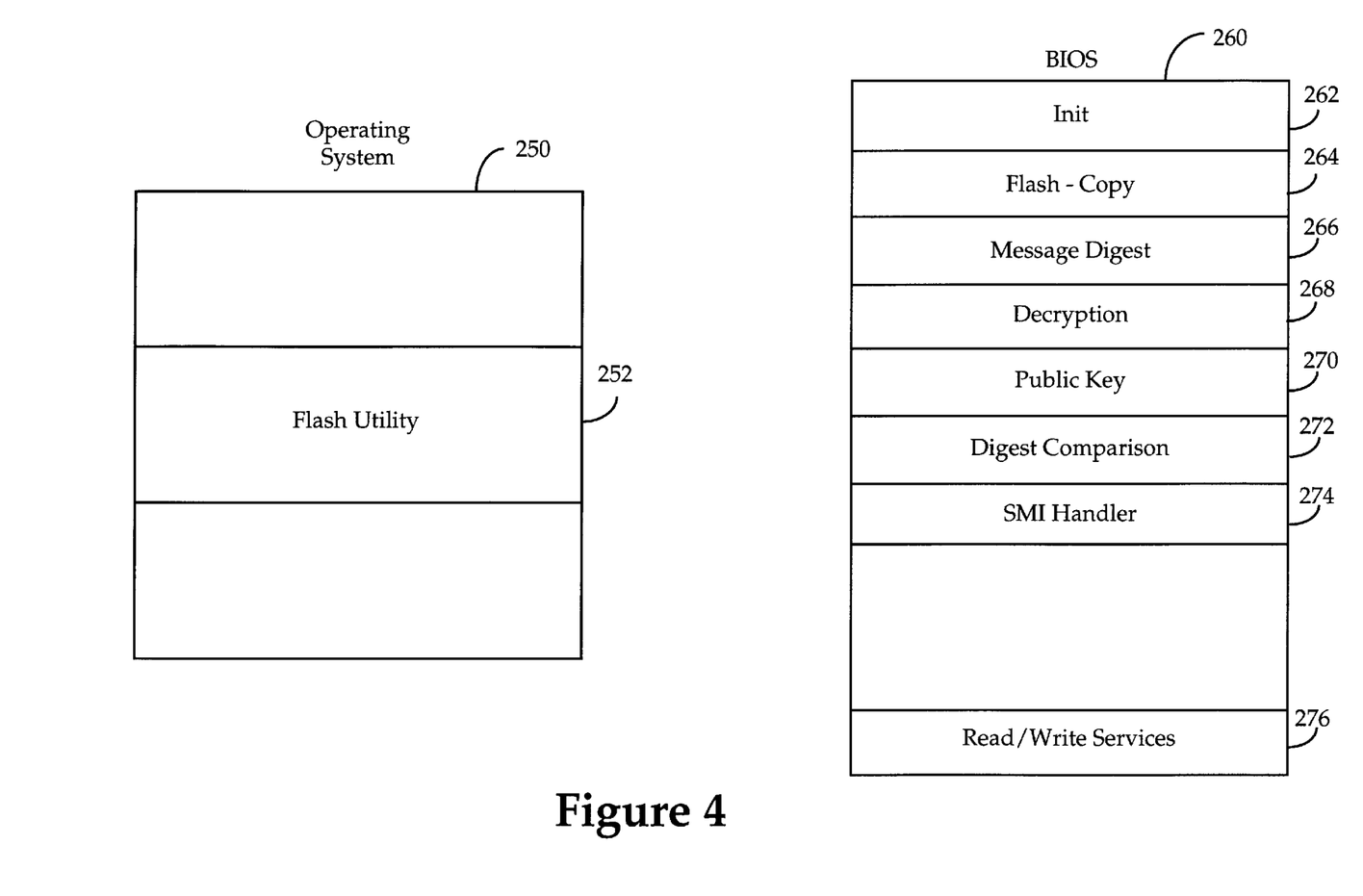
FIG. 4 illustrates the system BIOS, and for one embodiment, the operating system of the exemplary computer system in further detail.

FIG. 4 illustrates system BIOS and operating system of exemplary computer system 200 in further detail. As shown, system BIOS 260 includes init function 262, FLASH copy utility 264, message digest function 266, decryption function 268, public key 270, digest comparison function 272, SMI handler 274 and read/write service 276, whereas, for some embodiments, operating system 250 includes FLASH utility 252.

Init function 262 initializes system BIOS 260 during system initialization, including loading FLASH copy utility 264, message digest function 266, decryption function 268, public key 270, digest comparison function 272, and SMI handler 274 into system management memory 222. As described earlier, system management memory 222 is normally not mapped into system management space, unless a SMI is triggered placing processor 212 in SMM, and system management memory 222 is write disabled except for initialization, processor mode transition, and execution in SMM. Accordingly, these system BIOS functions are secured from malicious modification.

SMI handler 274 services SMIs, invoking other functions (including the write data authentication functions) as necessary, depending on the cause of a particular SMI. As will be described in more detail below, SMI handler 274 is given control upon entry into SMM. As described earlier, message digest 266 generates a digest in real time for the write data of a FLASH write request, in accordance to the content of the write data, and decryption function 268 decrypts the electronic signature "attached" to the write data of the FLASH write request using public key 270, to reconstitute the FLASH write data's original digest. Digest comparison function 272 compares the two digests, and finally FLASH copy utility 264 performs the actual writing of the authenticated data into FLASH memory 224. Message digest function 266, decryption function 268, digest comparison function 272, and FLASH copy utility 264 are invoked in due course by SMI handler 274 upon determining that a SMI is triggered by FLASH security circuitry 226.

Read/Write services 276 provides read and write services to I/O devices. Read/Write services 276 are among the bulk of the BIOS functions that are loaded into main memory 220 during system start up.

For some embodiments, FLASH utility 252 is included to perform various FLASH related functions including in particular copying of FLASH write data from an external source medium to a buffer in main memory 220, and then copying the FLASH write data from the buffer into FLASH memory 224 by way of read/write services 276, which invokes message digest function 266, decryption function 268, etc., to validate the FLASH write data, and if validated, FLASH copy utility 264 to perform the actual writing, to be described more fully below. Examples of such FLASH write data are system BIOS additions, deletions, and modifications described earlier, and an example of an external source medium is a diskette.

Figure 5:
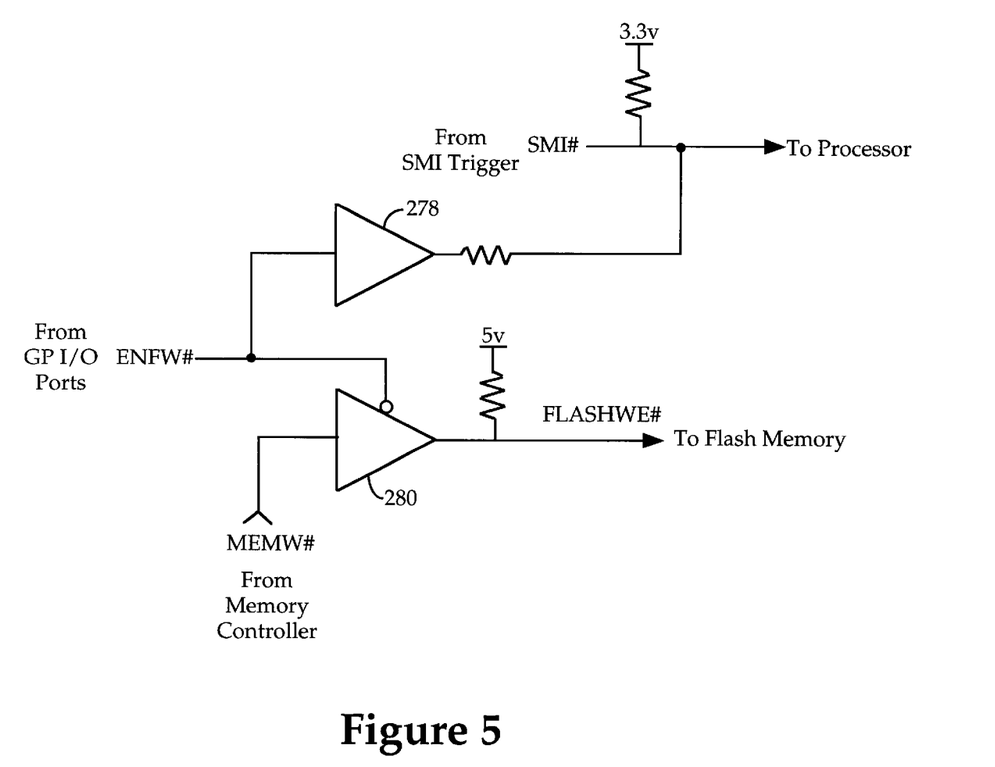
FIG. 5 illustrates the FLASH security circuitry of FIG. 3 in further detail.

FIG. 5 illustrates FLASH security circuit 226 in further detail. As shown, FLASH security circuit 226 includes first and second drivers 278 and 280. The input (ENFW#) of first driver 278 is provided by one of the I/O ports of GPIO ports 232, whereas the output of first driver 278 is coupled to a signal line coupling a SMI trigger mechanism to processor 212. Thus, whenever, GPIO ports 232 sets ENFW# active to enable write access, in response to a FLASH write request, first driver 278 causes a SMI to be triggered for processor 212.

The inputs (ENFW# and MEMW#) of second driver 280 are provided by the same I/O port of general purpose I/O ports 232 and memory controller 218 respectively, whereas the output (FLASHWE#) of second driver 280 is provided to FLASH memory 224. FLASHWE# is tri-stated. FLASHWE# becomes active, when both MEMW# and ENFW# are active. In other words, the write signal (MEMW#) from memory controller 218 is qualified by ENFW#, which at the same time through first driver 278 would cause a SMI to be triggered. Thus, the secured authentication functions stored in system management memory 222 would be invoked to authenticate the write data before allowing them to be written into FLASH memory 224.

Figure 6:
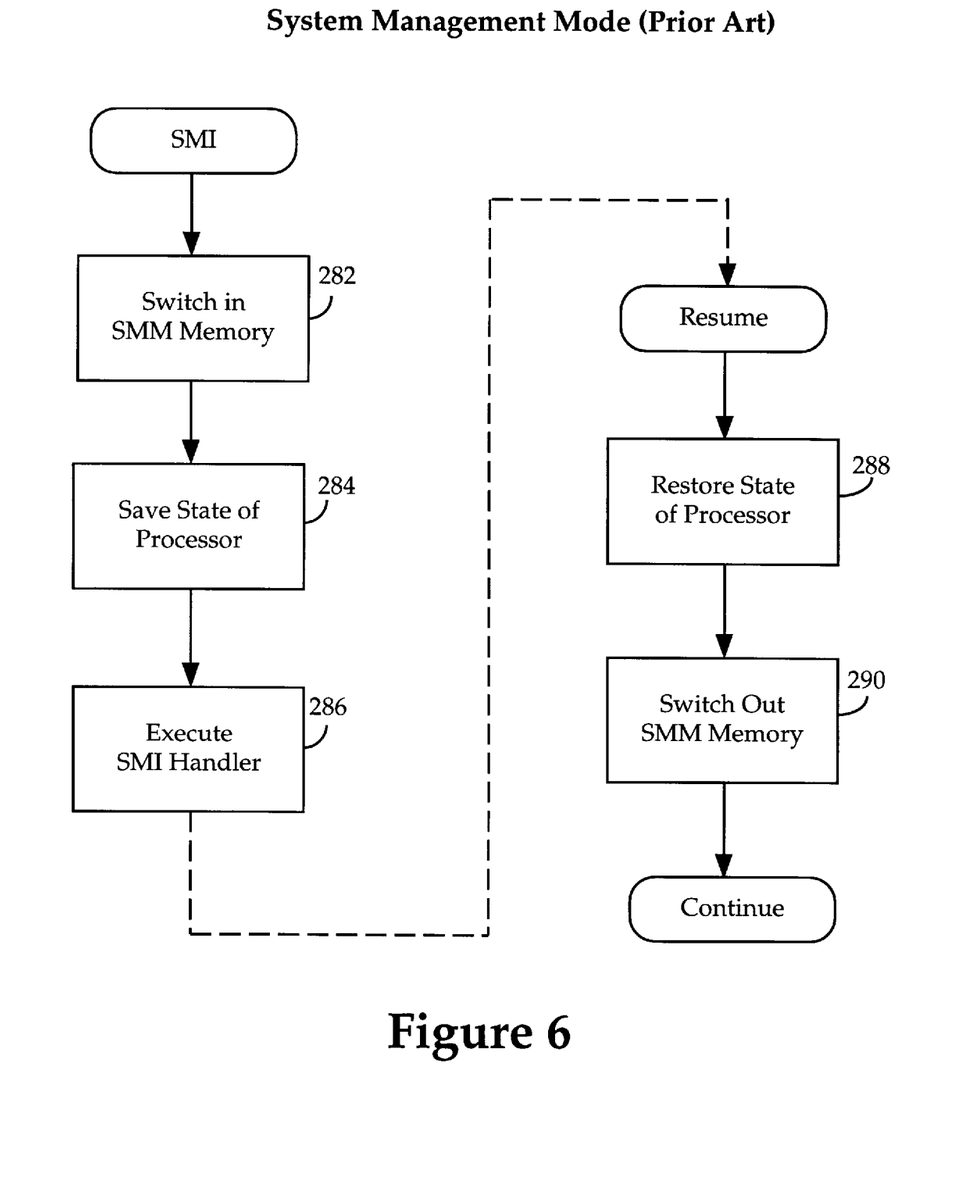
FIG. 6 illustrates execution flow of the exemplary computer system under a system management mode.

FIG. 6 illustrates execution flow of the exemplary computer system in SMM. As shown, upon detection of an SMI, processor 212 directs memory controller 218 to switch in and map system management memory 222 as part of the system memory space, and in response, memory controller 218 performs the requested switching and mapping accordingly, step 282. Next, processor 212 saves the processor state into system management memory 222, step 284. Upon saving the processor state, processor 212 transfers execution control to pre-stored SMI handler 274, step 286.

SMI handler 274 then determines the cause of the SMI and services the SMI accordingly, invoking other routines such as the authentication functions as necessary. Upon servicing the SMI, SMI handler 274 executes a Resume instruction to transfer execution control back to the interrupted programs. In response, processor 212 restores the saved processor state from system management memory 222, step 288. Furthermore, processor 212 directs memory controller 218 to unmap system management memory 222 from the system memory space and switch out system management memory 222. In response, memory controller 218 performs the requested unmapping and switching accordingly, step 290.

As a result, the SMI is serviced in a manner that is transparent to the executing operating system, subsystems as well as applications. In other words, an SMI is a transparent system service interrupt.

Figure 7:
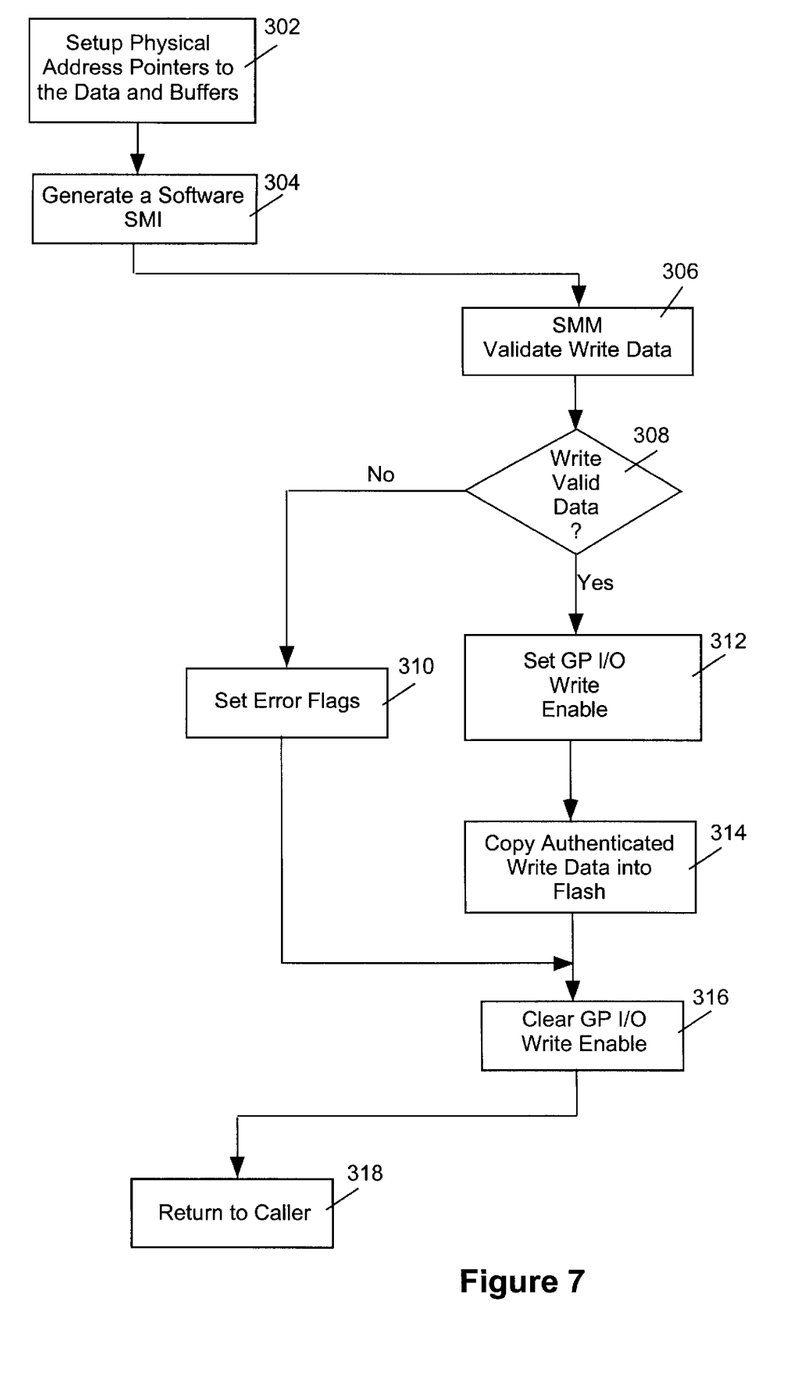
FIG. 7 illustrates one embodiment of the execution flow for writing into FLASH memory.

FIG. 7 illustrates one embodiment of the execution flow for writing data into FLASH memory 224. As shown, in response to a write request from an application, such as FLASH utility 252 described earlier, read/write services 276 set up the physical address pointers to the write data, step 302. Next, for the illustrated embodiment, read/write services 276 generate a software SMI to enter SMM and to provide the SMI handler with the physical address pointers of the write data, step 304. A software SMI is used and preferred at this point in time as opposed to the designated GPIO port 232 because FLASH memory would remain disabled during the authentication process.

Upon entry into SMM, as described earlier, SMI handler 274 is given control. Upon ascertaining the reason for the SMI, SMI handler 274 invokes message digest 266 and decryption function 268 to authenticate the write data identified by the physical address pointers, step 306. If the write data fails the authentication process, step 308, SMI handler 274 sets the appropriate error flags, step 310, clears the designated GPIO port, step 316, and exits SMM. Upon given control again, read/write services 276 returns to the caller, after performing the necessary "clean ups".

On the other hand, if at step 308, the write data passes the authentication process, SMI handler 274 enables write to FLASH memory 224, by setting the designated GPIO port 232, step 312. Once enabled, the authenticated write data are copied into FLASH memory 224, step 314. After all authenticated write data have been copied, as described earlier, SMI handler 274 clears the designated GPIO port 232, and exits SMM. Upon given control again, read/write services 276 returns to the caller, after performing the necessary "clean ups".

As described earlier, when SMI handler 274 enables write to FLASH memory 224 by way of the designated GPIO port, in addition to enabling FLASH memory 224 for write, a SMI is triggered. However, since this "new" SMI is triggered while the system is in SMM, the "new" SMI is discarded. The reason why the "new" SMI is triggered is because for the illustrated embodiment, the designated GPIO port 232 may be set outside SMM. The "automatic" SMI will ensure that the write data will be authenticated in the event that happens, preventing any possibility of bypassing the authentication process.

Thus, methods and apparatus for preventing unauthorized access to a protected non-volatile memory have been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a computer system comprising a non-volatile storage having stored therein data content, a computer implemented method for protecting the non-volatile storage from unauthorized write access that would result in unauthorized modification of the stored data content, the method comprising the steps of:

a) pre-storing a plurality of associated authentication functions in the non-volatile storage, reading the plurality of associated authentication functions from the non-volatile storage during computer system initialization, and securing the plurality of associated authentication functions on the computer system, the associated authentication functions operative to authenticate write data of a write access to the non-volatile storage using an electronic signature the content of which being functionally dependent on the content of the write data; and b) selectively invoking the associated authentication functions to authenticate the write data of subsequent write accesses to the non-volatile storage during operation, allowing only authenticated write data to be written into the non-volatile storage.

2. The computer implemented method as set forth in claim 1, wherein step (a) comprises securing the authentication functions in a secured portion of memory of the computer system.

3. The computer implemented method as set forth in claim 1, wherein the associated authentication functions of step (a) are implemented as a plurality of system basic input/output services (BIOS) of the computer system; and wherein step (a) comprises securing the associated authentication functions by copying the plurality of system BIOS implementing the associated authentication functions into system management memory of the computer system during system initialization, wherein the system management memory is not mapped into a normal system memory space of the computer system unless the computer system is executing in a system management mode, and wherein the system management memory is write protected except for system initialization and system execution mode transition.

4. The computer implemented method as set forth in claim 1, wherein the associated electronic signature is generated by encrypting a first digest with a secret private key, the first digest being generated based on the content of the write data of the write access; and step (b) comprises (b.1) providing read accessibility to the secured associated authentication functions;

(b.2) invoking a secured decryption function of the secured associated authentication functions reconstitute the first digest by decrypting the associated electronic signature using a secured public key complementary to the secret private key, (b.3) invoking a secured message digest function of the secured associated authentication functions to generate a second digest based on the content of the write data of the write access, and (b.4) invoking a secured digest comparison function of the secured associated authentication functions to determine if the write data of the write access is authentic by comparing the first and second digests.

5. The computer implemented method as set forth in claim 4, wherein step (b) further comprises step (b.5) conditionally invoking a secured copy utility of the secured associated authentication functions to copy the write data into the protected non-volatile storage if the first and second digests compared successfully in step (b.4).

6. A computer system comprising:

(a) a non-volatile storage having stored therein data content;

(b) a plurality of authentication functions associated with the data content and stored in the non-volatile storage, operative to authenticate write data of a write access to the non-volatile storage during operation, the associated authentication functions operative to authenticate the write data using an electronic signature which is functionally dependent on the content of the write data;

(c) a secured memory unit operative to store and secure the plurality of associated authentication functions read from the non-volatile storage during system initialization of the computer system; and (d) a processor coupled to the non-volatile storage and the secured memory unit operative to selectively invoke the associated authentication functions during operation of the computer system to authenticate the write data of subsequent write accesses to the non-volatile storage, protecting the non-volatile storage from unauthorized write access that would result in unauthorized modification of the stored data content.

7. The computer system as set forth in claim 6, wherein the plurality of authentication functions include a decryption function for reconstituting a first digest by decrypting the electronic signature with a public key, the electronic signature being generated by encrypting the first digest with a secret private key in a complementary manner, a message digest function for generating a second digest based on the content of the write data of the write access in the same manner the first digest was generated, and a digest comparison function for determining whether the write data of the write access is authentic by comparing the first and second digests.

8. The computer system as set forth in claim 7, wherein the decryption function, the message digest function and the digest comparison function are implemented as a plurality of system basic input/output services (BIOS) of the computer system, which are copied into the secured memory unit during system initialization, wherein the secured memory unit is not mapped into a normal system memory space of the computer system unless the processor is executing in system management mode, and wherein the secured memory unit is write protected except for system initialization and processor execution mode transition.

9. The computer system as set forth in claim 8, wherein the non-volatile storage is a FLASH memory storage unit for storing system BIOS;

the decryption function, the message digest function, the digest encryption function and the public key are pre-stored in the FLASH memory storage unit;

the computer system further includes main memory coupled to the processor; and the write data of the write access are system BIOS updates staged in a buffer in the main memory.

10. The computer system as set forth in claim 9, wherein the computer system further includes a memory controller coupled to the processor, the main memory, the secured memory unit and the FLASH memory for controlling memory access;

a FLASH security circuit coupled to the memory controller and the FLASH memory for qualifying a write signal provided by the memory controller to the FLASH memory for the write access, and for generating an interrupt to place the processor in the system management mode.

11. The computer system as set forth in claim 10, wherein the computer system further includes an I/O port coupled to the processor and the FLASH security circuit for notifying the FLASH security circuit of the write access.

12. The computer system as set forth in claim 7, wherein the plurality of authentication functions further include a copy function for conditionally copying the write data of the write access into the non-volatile storage if the digest comparison function successfully compares the first and second digests.

13. A computer system motherboard comprising:

(a) a non-volatile memory storage unit; and (b) system basic input/output services (BIOS) including a plurality of associated authentication functions stored in the non-volatile memory storage unit, wherein the plurality of associated authentication functions are read from the non-volatile storage and retained in secured memory upon initialization of a computer system integrated with the computer system motherboard, the plurality of associated authentication functions operative to authenticate write accesses to update the system BIOS using an electronic signature associated with the system BIOS updates, the content of the electronic signature being functionally dependent on the content of the system BIOS updates.

14. The computer system motherboard as set forth in claim 13, wherein the computer system motherboard further includes (c) main memory for staging the system BIOS updates in a buffer.

15. The computer system motherboard as set forth in claim 14, wherein the computer system motherboard further includes (d) system management memory for storing and securing the plurality of associated authentication functions during operation of the computer system, the plurality of associated authentication functions being copied into the system management memory during system initialization, wherein the system management memory is not mapped into a normal system memory space of the computer system unless the computer system is executing in a system management mode, and wherein the system management memory is write protected except for system initialization and system execution mode transition.

16. The computer system motherboard as set forth in claim 15, wherein the computer system motherboard further comprises (e) a processor coupled to the non-volatile memory storage and the system management memory for invoking the authentication functions during operation of the computer system in system management mode to authenticate the system BIOS updates, and to allow only authenticated system BIOS updates to be written from the buffer of main memory into the non-volatile memory storage unit.

17. The computer system motherboard as set forth in claim 16, wherein the computer system motherboard further comprises:

(f) a memory controller coupled to the processor, the main memory, the system management memory and the non-volatile memory storage unit for controlling memory access;

(g) a non-volatile memory access security circuit coupled to the memory controller and the non-volatile memory storage unit for qualifying a write signal provided by the memory controller to the non-volatile memory storage unit for a write access initiated to write the system BIOS updates into the non-volatile memory storage unit, and for generating an interrupt to place the computer system in the system management mode.

18. The computer system motherboard as set forth in claim 17, wherein the computer system motherboard further includes an I/O port coupled to the processor and the non-volatile memory access security circuit for notifying the nonvolatile memory security circuit of the write access.

19. The computer system motherboard as set forth in claim 13, wherein the plurality of authentication functions include a decryption function for reconstituting a first digest by decrypting the electronic signature with a public key, the electronic signature being generated by encrypting the first digest with a secret private key in a complementary manner, a message digest function for generating a second digest based on the content of the system BIOS updates in the same manner the first digest was generated, and a digest comparison function for determining whether the system BIOS updates are authentic by comparing the first and second digests.

20. The computer system as set forth in claim 19, wherein the plurality of authentication functions further include a copy function for conditionally copying the system BIOS updates into the non-volatile memory storage unit if the digest comparison function successfully compares the first and second digests.

21. The computer implemented method of claim 4, wherein unsecuring the secured associated authentication functions (b.1) comprises issuing a system management interrupt (SMI) placing the computer system into SMM, wherein the system management memory is mapped to the normal memory space from which the associated authentication functions are selectively invoked to authenticate received data.

22. The computer system of claim 6, wherein the processor enters system management mode upon the receipt of a system management interrupt (SMI), whereafter, the processor selectively invokes the associated authentication functions to authenticate received data.

23. The computer system motherboard of claim 15, wherein the computer system enters system management mode upon receipt of a system management interrupt (SMI), whereafter, the computer system selectively invokes the associated authentication functions to authenticate received data.

* * * * *